United States Patent
Gusikhin et al.

(10) Patent No.: US 11,868,909 B2
(45) Date of Patent: Jan. 9, 2024

(54) ENHANCED VEHICLE MAINTENANCE

(71) Applicant: Ford Global Technologies, LLC, Dearborn, MI (US)

(72) Inventors: Oleg Yurievitch Gusikhin, Commerce Township, MI (US); Yu-Ning Liu, Ann Arbor, MI (US); Eduardo Andres Garcia Magraner, Ribarroja del Turia (ES); Jing Chen, Westland, MI (US); William Finkenstaedt, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 597 days.

(21) Appl. No.: 16/776,560

(22) Filed: Jan. 30, 2020

(65) Prior Publication Data
US 2021/0241128 A1  Aug. 5, 2021

(51) Int. Cl.
*G06N 5/04* (2023.01)
*G07C 5/08* (2006.01)
(Continued)

(52) U.S. Cl.
CPC ............... *G06N 5/04* (2013.01); *G07C 5/006* (2013.01); *G07C 5/02* (2013.01); *G07C 5/08* (2013.01);
(Continued)

(58) Field of Classification Search
CPC . G07C 5/006; G07C 5/02; G07C 5/08; G07C 5/0808; G07C 5/0816; G07C 5/0841
See application file for complete search history.

(56) References Cited

U.S. PATENT DOCUMENTS

| | | |
|---|---|---|
| 5,132,920 A | 7/1992 | Bellows et al. |
| 6,609,051 B2 | 8/2003 | Fiechter et al. |

(Continued)

FOREIGN PATENT DOCUMENTS

| | | |
|---|---|---|
| CN | 107862560 A | 3/2018 |
| CN | 108171344 A | 6/2018 |
| WO | 20141131185 A1 | 9/2019 |

OTHER PUBLICATIONS

Taheri, E., et al., "Failure Prognostics for In-Tank Fuel Pumps of the Returnless Fuel Systems," Proceedings of the ASME 2016 Dynamic Systems and Control Conference, Minneapolis, Minnesota, Oct. 12-14, 2016, 10 pages.

(Continued)

*Primary Examiner* — James J Lee
*Assistant Examiner* — Wenyuan Yang
(74) *Attorney, Agent, or Firm* — Brandon Hicks; Bejin Bieneman PLC

(57) ABSTRACT

A computer includes a processor and a memory storing instructions executable by the processor to predict a time to failure of a vehicle component according to a damage model generated from vehicle operating data, based on the predicted time to failure, retrieve a schematic of the vehicle component and input the schematic to an additive printer to manufacture a replacement vehicle component, and replace the vehicle component with the replacement vehicle component according to maintenance instructions that, based at least in part on the predicted time to failure, specify a time and location to replace the vehicle component.

20 Claims, 3 Drawing Sheets

(51) Int. Cl.
*G07C 5/02* (2006.01)
*G07C 5/00* (2006.01)

(52) U.S. Cl.
CPC ......... *G07C 5/0808* (2013.01); *G07C 5/0816* (2013.01); *G07C 5/0841* (2013.01)

(56) References Cited

U.S. PATENT DOCUMENTS

| | | | |
|---|---|---|---|
| 6,651,012 | B1 | 11/2003 | Bechhoefer |
| 6,721,685 | B2 | 4/2004 | Kodama |
| 6,922,616 | B2 | 7/2005 | Obradovich et al. |
| 7,496,475 | B2 | 2/2009 | Byrne et al. |
| 7,650,210 | B2 | 1/2010 | Breed |
| 8,099,308 | B2 | 1/2012 | Uyeki |
| 8,190,322 | B2 | 5/2012 | Lin et al. |
| 8,285,439 | B2 | 10/2012 | Hodges |
| 8,751,100 | B2 | 6/2014 | Johnson et al. |
| 8,996,235 | B2 | 3/2015 | Singh et al. |
| 9,142,066 | B2 | 9/2015 | Chen et al. |
| 9,619,611 | B2 | 4/2017 | Giguere et al. |
| 9,881,428 | B2 | 1/2018 | Barfield, Jr. et al. |
| 10,049,505 | B1* | 8/2018 | Harvey ................. G07C 5/0841 |
| 10,991,172 | B1* | 4/2021 | Oakes, III ............ G07C 5/0808 |
| 2002/0016655 | A1* | 2/2002 | Joao ....................... G07C 5/085 701/33.4 |
| 2008/0140361 | A1* | 6/2008 | Bonissone ......... G05B 23/0283 703/2 |
| 2009/0005928 | A1* | 1/2009 | Sells .................... G07C 5/0808 701/31.7 |
| 2010/0114423 | A1 | 5/2010 | Boss et al. |
| 2018/0232964 | A1 | 8/2018 | Chen et al. |
| 2018/0257683 | A1* | 9/2018 | Govindappa ........... B61L 27/57 |
| 2019/0030605 | A1 | 1/2019 | TenHouten et al. |
| 2019/0188924 | A1* | 6/2019 | Guan ..................... G07C 5/008 |
| 2019/0213803 | A1* | 7/2019 | Ye .......................... G07C 5/008 |
| 2020/0033812 | A1* | 1/2020 | Neyens .............. G06Q 30/0633 |
| 2020/0133235 | A1* | 4/2020 | El-Tahry ............ G05B 19/4099 |

OTHER PUBLICATIONS

Makki, O., et al., "Connected Vehicle Prognostics Framework for Dynamic Systems," Research and Advanced Engineering, Ford Motor Company, Dearborn, MI, 2019, 13 pages.

Garcia, E., et al., "Mini-term, a novel paradigm for failure prognosis," Ford Spain; Department of Mathematics, Physics and technological Sciences, University CEU Cardenal Herrera; Ford Motor Company, Research and Innovation centre; 2019, 6 pages.

Taheri, E., et al., "Survey of prognostics methods for condition-based maintenance in engineering systems," Department of Aerospace Engineering, University of Michigan, Dec. 3, 2019, 74 pages.

* cited by examiner

ENHANCED VEHICLE MAINTENANCE

BACKGROUND

Vehicles have a variety of components or parts that provide functionality and/or perform operations for the vehicle. Vehicle components can wear, break, and/or become damaged. It can be necessary and/or desirable to replace various components at various times. However, a part or component may be unavailable at a maintenance facility. Further, it is a problem that current technical infrastructures and architectures lack mechanisms to allow maintenance facilities to efficiently, accurately, and reliably obtain, e.g., manufacture or fabricate, parts or components.

DETAILED DESCRIPTION

Figure 1:
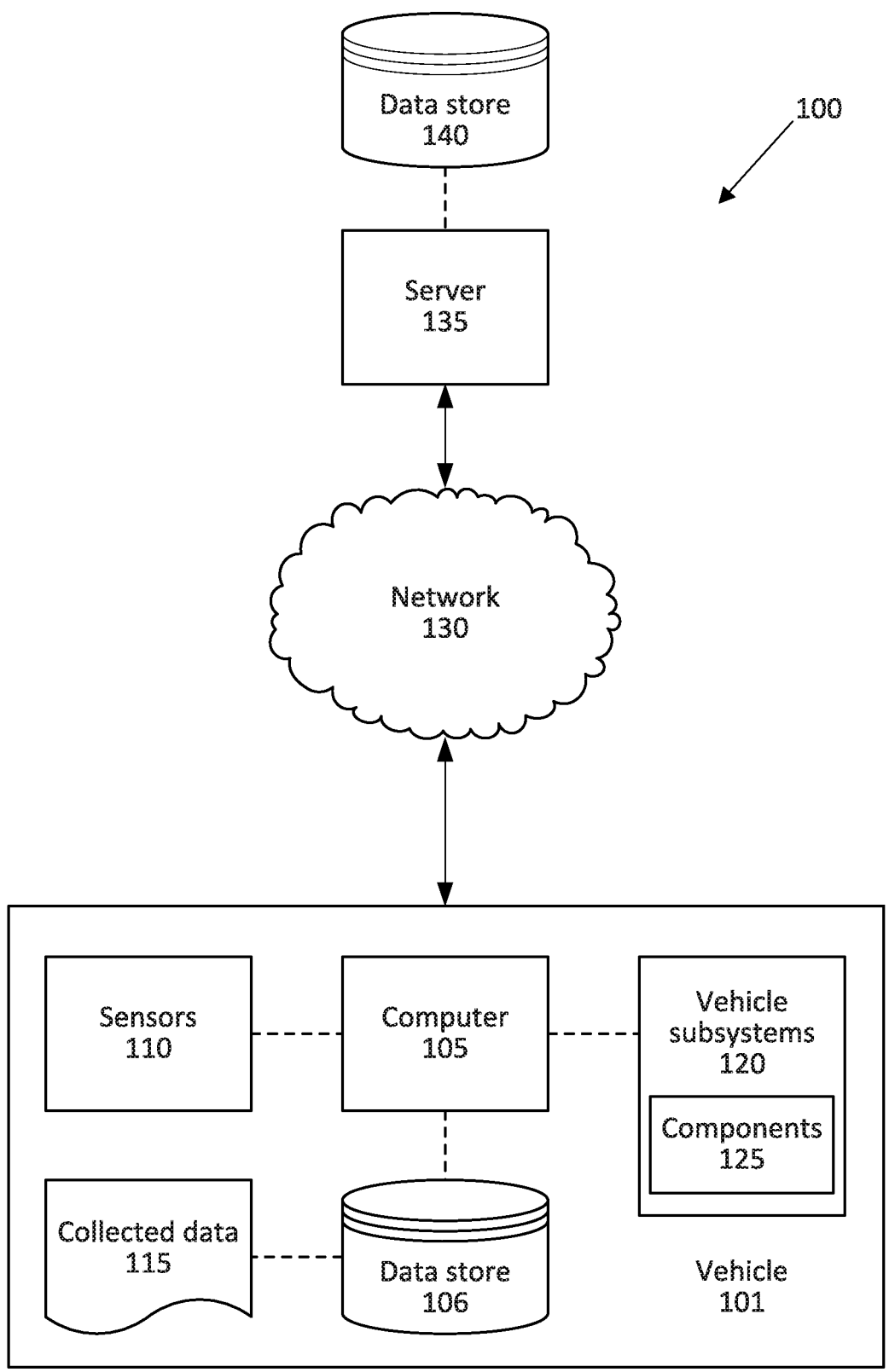
FIG. 1 is a block diagram of an example system for manufacturing and providing components to a vehicle.

A system includes a computer including a processor and a memory, the memory storing instructions executable by the processor to predict a time to failure of a vehicle component according to a damage model generated from vehicle operating data, based on the predicted time to failure, retrieve a schematic of the vehicle component and input the schematic to an additive printer to manufacture a replacement vehicle component, and replace the vehicle component with the replacement vehicle component according to maintenance instructions that, based at least in part on the predicted time to failure, specify a time and location to replace the vehicle component.

The instructions can further include instructions to actuate a repair machine at the specified location according to the maintenance instructions.

The damage model can include at least one of a mass reduction rate, a temperature-based wear rate, or a mass flow rate.

The instructions can further include instructions to predict the time to failure based on at least one of a vibration or a sound from the vehicle component.

The instructions can further include instructions to predict the time to failure when output performance of the vehicle component falls below a threshold.

The maintenance instructions can include a list of tools and the instructions can further include instructions to specify the location to replace the vehicle component as a location having all tools in the list of tools.

The maintenance instructions can include a list of tools and the instructions can further include instructions to input a tool schematic of one of the tools in the tool list to the additive printer to manufacture the tool.

The instructions can further include instructions to specify the time to replace the vehicle component based on a delivery time of one of a tool or a second vehicle component to the specified location.

The instructions can further include instructions to actuate a propulsion to move a vehicle to which the vehicle component is installed to the specified location prior to the specified time.

The instructions can further include instructions to specify the time to replace the vehicle component based on a predicted amount of time required to complete the maintenance instructions.

The instructions can further include instructions to predict the time to failure based on a previous maintenance time of the vehicle component.

The specified time can be based on a predicted time that the additive printer will complete manufacturing of the replacement vehicle component.

A method includes predicting a time to failure of a vehicle component according to a damage model generated from vehicle operating data, based on the predicted time to failure, retrieving a schematic of the vehicle component and inputting the schematic to an additive printer to manufacture a replacement vehicle component, and replacing the vehicle component with the replacement vehicle component according to maintenance instructions that, based at least in part on the predicted time to failure, specify a time and location to replace the vehicle component.

The method can further include actuating a repair machine at the specified location according to the maintenance instructions.

The method can further include predicting the time to failure based on at least one of a vibration or a sound from the vehicle component.

The method can further include predicting the time to failure when output performance of the vehicle component falls below a threshold.

The maintenance instructions can include a list of tools and the method can further include specifying the location to replace the vehicle component as a location having all tools in the list of tools.

The maintenance instructions can include a list of tools and the method can further include inputting a tool schematic of one of the tools in the tool list to the additive printer to manufacture the tool.

The method can further include specifying the time to replace the vehicle component based on a delivery time of one of a tool or a second vehicle component to the specified location.

The method can further include actuating a propulsion to move a vehicle to which the vehicle component is installed to the specified location prior to the specified time.

The method can further include specifying the time to replace the vehicle component based on a predicted amount of time required to complete the maintenance instructions.

The method can further include predicting the time to failure based on a previous maintenance time of the vehicle component.

A system includes a vehicle including a plurality of vehicle components, means for predicting a time to failure of one of the vehicle components according to a damage model generated from vehicle operating data, means for retrieving a schematic of the vehicle component based on the predicted time to failure and inputting the schematic to an additive printer to manufacture a replacement vehicle component, and means for replacing the vehicle component with the replacement vehicle component according to maintenance instructions that, based at least in part on the predicted time to failure, specify a time and location to replace the vehicle component.

The system can further include means for actuating a repair machine at the specified location according to the maintenance instructions.

The system can further include means for predicting the time to failure based on at least one of a vibration or a sound from the vehicle component.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

A server can include prognostics models to predict times to failure for one or more components of a vehicle. Upon identifying a component that requires maintenance, the server can retrieve maintenance instructions, e.g., from another server. The maintenance instructions can include a list of tools to perform the maintenance instructions, a list of replacement components, and three-dimensional schematics for the replacement components. Further, the server addresses the lack of existing technical infrastructure by instructing an additive printer at a repair location to manufacture or fabricate the replacement components according to the dynamically provided (i.e., in real-time or near real-time) three-dimensional schematics. Further advantageously, the repair machine can increase efficiency of replacing the component of the vehicle by filling in a gap in existing technical infrastructure to install the replacement component in the vehicle according to the maintenance instructions. Identifying a component in a vehicle that requires maintenance, additively printing a replacement component, and replacing the component at a specified location with a repair machine provides maintenance to the vehicle with increased efficiency, accuracy, and reliability.

FIG. 1 illustrates an example system 100 for manufacturing and providing components to a vehicle 101. The system 100 includes a computer 105. The computer 105, typically included in the vehicle 101, is programmed to receive collected data 115 from one or more sensors 110. For example, vehicle 101 data 115 may include a location of the vehicle 101, data about an environment around a vehicle 101, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus such as a CAN bus, LIN bus etc., and or other wired and/or wireless technologies, e.g., Ethernet, WIFI, etc. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 130, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data. The computer 105 can collect "operating" data i.e., a subset of data 115 of operation of the vehicle 101 that is collected about operation of one or more vehicle 101 subsystems and/or components 120, operation data 115 including operation parameters of the vehicle 101. In this context, an "operation parameter" is a measurable quantity of operation of a vehicle component 125, i.e., a measurement of a physical phenomenon or phenomena resulting from operation of the component 125, as discussed further below. Example operation parameters include, e.g., a vehicle speed, a steering torque, a braking torque, a fuel flow rate, a transmission speed, a temperature, a viscosity of a fluid (e.g., engine oil) indicating fluid degradation, etc.

The vehicle 101 can include a plurality of vehicle subsystems 120. In this context, each vehicle subsystem 120 includes one or more hardware components 125 adapted to perform a mechanical function or operation—such as moving the vehicle 101, slowing or stopping the vehicle 101, steering the vehicle 101, etc. That is, each "component" 125 of the subsystem 120 is a physical part or a collection of physical parts, provided for some physical action, function, or operation, included in the subsystem 120. Non-limiting examples of subsystems 120 include a propulsion subsystem 120 (that includes, e.g., an internal combustion engine and/or an electric motor, etc., components 125 of which include pistons, motors, drive shafts, fuel injectors, etc.), a transmission subsystem 120, a steering subsystem 120 (components 125 of which may include one or more of a steering wheel, a steering rack, a steering gear, etc.), a brake subsystem 120 (components 125 of which may include a brake pad, a brake cable, a brake pump, a brake pedal, etc.), a park assist subsystem 120, an adaptive cruise control subsystem 120, an adaptive steering subsystem 120, a movable seat subsystem 120 (components 125 of which may include a track, a seat rail, a motor, etc.), and the like.

When the computer 105 partially or fully operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle propulsion, braking, and steering are controlled by the computer 105. A semi-autonomous mode is one in which at least one of vehicle propulsion, braking, and steering are controlled at least partly by the computer 105 as opposed to a human operator. In a non-autonomous mode, i.e., a manual mode, the vehicle propulsion, braking, and steering are controlled by the human operator.

The system 100 can further include a network 130 connected to a server 135 and a data store 140. The computer 105 can further be programmed to communicate with one or more remote sites such as the server 135, via the network 130, such remote site possibly including a data store 140. The network 130 represents one or more mechanisms by which a vehicle computer 105 may communicate with a remote server 135. Accordingly, the network 130 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
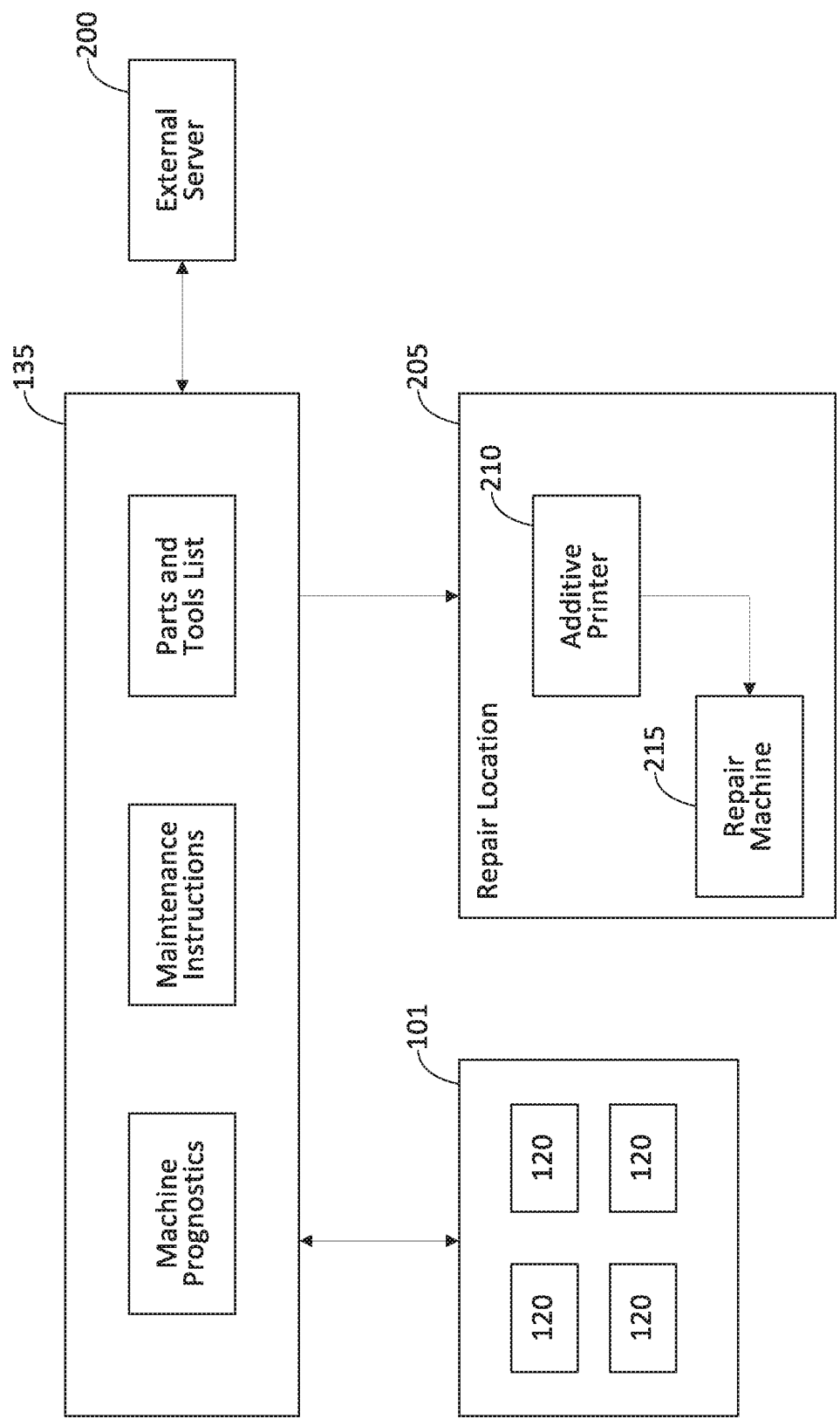
FIG. 2 is a block diagram of an example process for replacing a component of the vehicle.

FIG. 2 is a block diagram of a system for replacing a component 125 of a subsystem 120 of a vehicle 101. The server 135 can identify a component 125 that requires maintenance. The server 135 can use operating data 115 from the subsystems 120 sent by the computer 105 to the server 135 over the network 130 to predict a time of failure for one of the components 125 of the subsystems 120. The server 135 can input the operating data 115 to a damage model. As described above, the operating data 115 include data 115 about one or more operation parameters, i.e., measurable quantity of operation of a component 125 of a subsystem 120. In this context, a "damage model" is a simulation that receives operation data 115 as input and outputs predicted damage to a component 125 based on the operation data 115 of the subsystem 120. The damage model can be a conventional prognostics model for a subsystem 120 that receives operating data 115 as input and outputs a predicted time to failure for components 125 of the subsystem 120. Example prognostics models such as known in the art can include those described in, e.g., Makke O., Gusikhin O. (2019) *Connected Vehicle Prognostics Framework for Dynamic Systems*. In: Abraham A., Kovalev S., Tarassov V., Snasel V., Sukhanov A. (eds) Proceedings of the Third International Scientific Conference "Intelligent Information Technologies for Industry" (IITI' 18). IITI'18 2018. Advances in Intelligent Systems and Computing, vol 874 (hereinafter "Makke"), incorporated fully herein by reference in its entirety. Alternatively or additionally, the computer 105 can use the damage model to predict the time to failure based on operation data 115. In this context, a "time to failure" is a predicted time at which the damage model predicts the damage to the component 125 would prevent the subsystem 120 from operating above a predetermined threshold. The threshold can be determined for each subsystem 120 according to each specific damage model, and can be based on, e.g., manufacturer recommendations, empirical testing of components 125 of the subsystem 120 in test vehicles 101, comparison of performance metrics of damaged components 125 with require performance metrics to operate the vehicle 101, etc.

The damage model can be a prognostics model, as described above. A "prognostics" model is a model that predicts when a subsystem 120 or component 125 will no longer perform its intended function. The prognostics models can use one or more conventional techniques to predict damage to the component 125, e.g., pattern-recognition and machine learning algorithms, stochastic models, cumulative damage extrapolation, defect propagation techniques, pre-estimate fusion, post-estimate fusion, etc. The prognostics model receives operation data 115 as input, process the operation data 115 according to the techniques, and outputs a predicted time to failure of the component 125.

The prognostics model can be a conventional prognostics model that predicts damage to the component 125 with a function of operating characteristics and measurable values of the component 125. For example, the prognostic model can include at least one of a mass reduction rate, a temperature-based wear rate, or a mass flow rate. A prognostics model for a fuel pump is known in the art as described in Taheri, Ehsan, Gusikhin, Oleg, and Kolmanovsky, Ilya, "Failure Prognostics for In-Tank Fuel Pumps of the Returnless Fuel Systems," *Proceedings of the ASME* 2016 *Dynamic Systems and Control Conference. Volume 1: Advances in Control Design Methods, Nonlinear and Optimal Control, Robotics, and Wind Energy Systems; Aerospace Applications; Assistive and Rehabilitation Robotics; Assistive Robotics; Battery and Oil and Gas Systems; Bioengineering Applications; Biomedical and Neural Systems Modeling, Diagnostics and Healthcare; Control and Monitoring of Vibratory Systems; Diagnostics and Detection; Energy Harvesting; Estimation and Identification; Fuel Cells/Energy Storage; Intelligent Transportation.* Minneapolis, Minnesota, USA. Oct. 12-14, 2016. V001T12A002. ASME, available at https://doi.org/10.1115/DSCC2016-9725 (hereinafter "Taheri").

The prognostic model for a fuel pump, as described in Taheri cited above, can receive as inputs a mass flow rate $\dot{m}_f(t)$ of fuel flowing through the fuel pump that is based on an air/fuel ratio, an empirically determined factor that accounts for fuel leakage into the fuel tank $\varepsilon(t)$, and an empirically determined factor that accounts for damage caused by engine load $\eta(FLI(t))$ to determine workload rate $$\frac{dw}{dt}:$$

$$\frac{dw}{dt} = (1 + \varepsilon(t))\dot{m}_f(t)\eta(FLI(t)) \quad (1)$$

The prognostic model for the fuel pump can output a predicted damage for the fuel pump and a predicted time to failure of the fuel pump based on the workload rate dw/dt, i.e., a time at which the damage to the fuel pump exceeds a predetermined damage threshold. The prognostic model can use a statistical function such as a Weibull function to predict one or more of the parameters of the prognostics model to predict the damage to the component 125. The prognostics model can receive as inputs data 115 indicating a sound or a vibration from the component 125 and can predict the time to failure based on the sound or the vibration. That is, the prognostics model can include a damage calculation based on an amplitude of the sound or the vibration.

As another example, the prognostics model for an air filter can receive as input an air velocity, a particulate concentration, and a filter penetration to determine a rate of change of the particulate accumulation and output a predicted particulate accumulation. The prognostics model for the air filter is described in the Makke reference cited above. The predicted "particulate accumulation," i.e., the number of particles accumulated in the air filter, represents the damage to the air filter. The server 135 can determine that the predicted time that the predicted particulate accumulation exceeds an accumulation threshold is the predicted time to failure for the air filter. The accumulation threshold can be a predetermined value based on, e.g., manufacturer recommendations for particulate accumulation of an air filter, empirical testing of air filters with predetermined amounts of particulates, etc. Additional prognostics models such as known in the art are described in "Mini-term, a novel paradigm for fault detection," E. Garcia, N. Montes, available at https://events.infovaya.com/presentation?id=53286, and "Survey of prognostics methods for condition-based maintenance in engineering systems," E. Taheri, I. Kolmanovsky, O. Gusikhin, available at https:arxiv.org/abs/1912.02708, which are incorporated by reference in their entirety.

Upon predicting the time to failure for the component 125, the server 135 can determine maintenance instructions to replace the component 125. The server 135 can include predetermined maintenance instructions for each component 125 of each subsystem 120 in the data store 135 and can identify the specific maintenance instructions based on the identified component 125. The maintenance instructions include steps or operations that a repair machine can follow to replace the component 125 with a replacement component 125. The server 135 can communicate with an external server 200 to receive information required to replace the component 125. For example, the server 135 can receive a schematic of the component 125 from the external server 200, i.e., a three-dimensional computer drawing such as a Computer Aided Design (CAD) file that can be input to an additive printer to manufacture a replacement component 125. In another example, the server 135 can receive a list of tools required to perform the maintenance instructions from the external server 200.

Upon receiving the maintenance instructions, the server 135 can specify a time and a location to replace the component 125. The specified time can be a time prior to the predicted time to failure. That is, the server 135 can specify a time to replace the component 125 prior to failure of the component 125. For example, the server 135 can specify the time based on a predicted time to reach the specified location, described below, to perform maintenance on the component 125, e.g., a week before the predicted time to failure. In another example, the specified time can be a time that the additive printer 210 is predicted to complete manufacturing of the replacement component 125. The specified time can be based on delivery time of one of a tool in the list of tools or a second vehicle component 125 to the specified location. That is, in addition to manufacturing the replacement vehicle component 125 with the additive printer 210, the server 135 can actuate delivery of additional components 125 and/or tools to the repair location 205 necessary to perform the maintenance instructions. The server 135 can specify the time based on a previous maintenance time of the component 125. For example, the maintenance instructions can indicate that the component 125 should be replaced at specific time intervals, e.g., three months, six months, etc. The server 135 can compare a previous maintenance time, i.e., a time at which the component 125 was previously replaced and/or maintained, to the time interval specified by the maintenance instructions. The server 135 can specify a time that is prior to the duration of the time interval from the previous maintenance time.

The server 135 can specify the location to replace the component 125 as a repair location 205 that has the necessary facilities to replace the component 125. That is, the server 135 can identify a repair location 205 that includes an additive printer 210 to manufacture the replacement component 125 and all of the tools in the tool list provided by the maintenance instructions. The "additive printer" 210 is a machine that manufactures objects by depositing layers of a material, allowing the layers to harden, and then depositing additional layers of material according to a schematic until a replacement component 125 is manufactured. That is, the additive printer 210 is a three-dimensional printer and/or an additive manufacturing machine. The additive printer 210 can be, e.g., a Stratays 900 MC that manufactures polymer parts or a Desktop Metal that manufactures metal parts. Alternatively, the server 135 can instruct the additive printer 210 to manufacture one or more of the tools in a tool list in the maintenance instructions.

The repair location 205 can include a repair machine 215. The repair machine 215 can be a machine that can remove and replace the component 125 of the vehicle 101 with the replacement component 125 manufactured by the additive printer 210. That is, the repair machine 215 can receive the maintenance instructions from the server 135 and can follow the maintenance instructions to replace the component 125. For example, the repair machine 215 can include an arm that removes the current component 125 of the vehicle 101, places the replacement component 125 manufactured by the additive printer 210 on the location of the component 125 specified by the maintenance instructions, and applies the tools to secure the component 125 to the vehicle 101. In another example, the repair machine 215 can include a rotatable tool (e.g., a socket wrench, a screwdriver, etc.) to remove fasteners from the component 125 to install the replacement component 125. The repair location 205 can include a plurality of repair machines 215 to apply the maintenance instructions to replace the component 125. In yet another example, the repair machine 215 can include a plurality of machines, e.g., a Fanuc 2000iB 210F robot that includes a vision system to locate a component 125 (e.g., a windshield) and an adhesive applicator to apply an adhesive bead around an inside perimeter of the component 125, a second robot that includes a vision system and a plurality of suction cups to lift the component 125, locate an installation location on the vehicle 101 (e.g., a window opening), and place the component 125 in the installation location. Other example repair machines 215 include, e.g., Rolls Royce Nano Robots, Dextre robots, Audi Robotic apparatuses, etc.

The server 135 can instruct the computer 105 to move the vehicle 101 to the specified repair location 205 at the specified repair time. The server 135 can transmit the instructions over the network 130 at a time prior to the specified repair time, e.g., a day before the specified repair time. That is, the computer 105 can operate the vehicle 101 in an autonomous mode to actuate a propulsion, steering, and brake to move the vehicle 101 to arrive at the repair location 205 prior to the specified repair time. The computer 105 can, based on a current location of the vehicle 101, the repair location 205, and the specified repair time, plan actuation of the propulsion, steering, and brake with a conventional navigation algorithm to move the vehicle 101 to the repair location 205 at the specified repair time. Thus, at the specified repair time, the vehicle 101 will be at the repair location 205 for the repair machine to replace the component 125.

Figure 3:
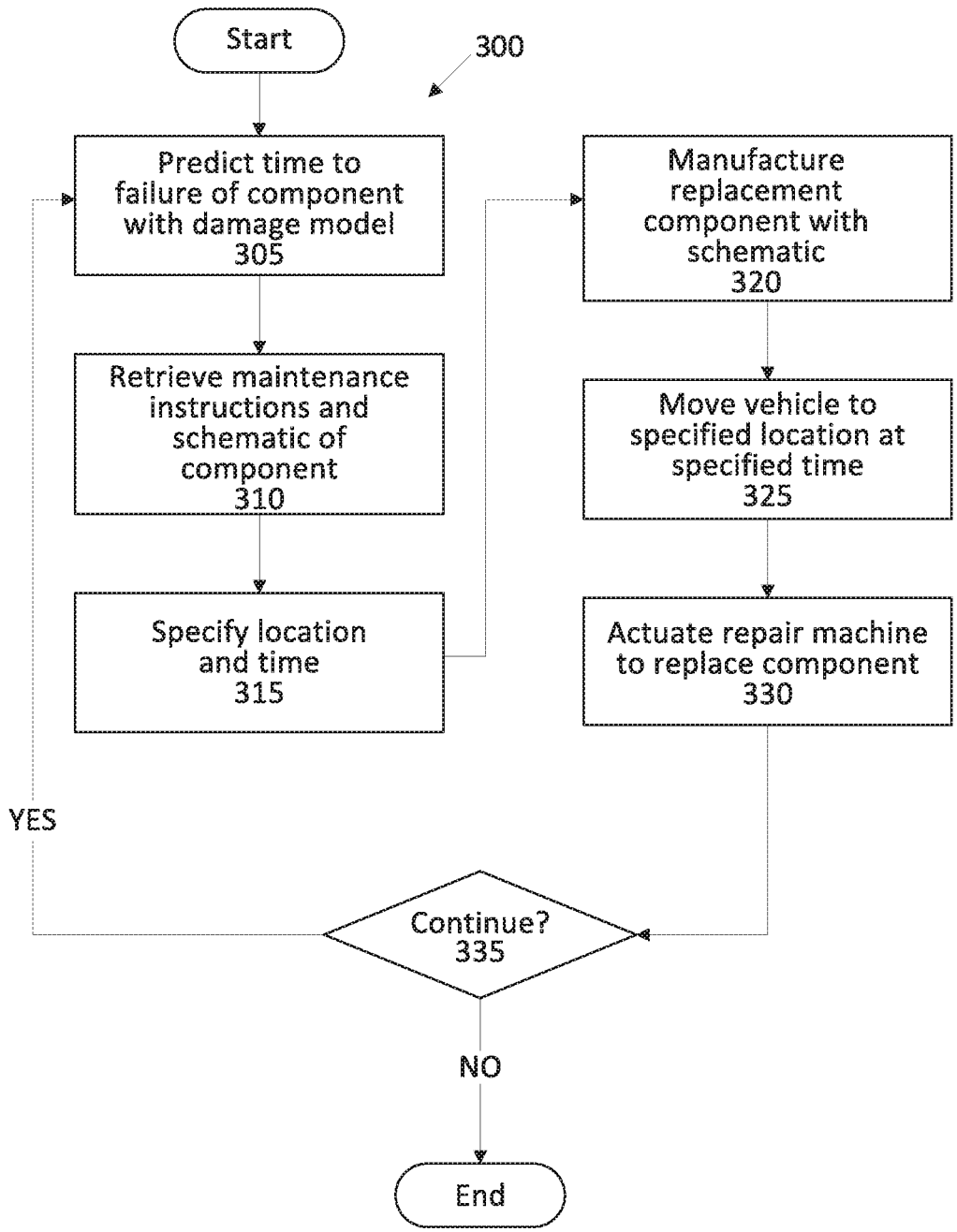
FIG. 3 is a block diagram of an example process for maintaining the vehicle.

FIG. 3 is a block diagram of an example process 300 for maintaining a vehicle 101. The process 300 begins in a block 305, in which a server 135 predicts a time to failure for a component 125 of a subsystem 120 of a vehicle 101 with a damage model. A computer 105 of the vehicle 101 can transmit diagnostic data of subsystems 120 of the vehicle 101 over the network 130 to the server 135. The damage model receives the vehicle 101 diagnostic data 115 for the subsystems 120 as input and outputs a predicted time at which one of the components 125 of the subsystems 120 will fail. The damage model can be, e.g., a conventional prognostics model as described above.

Next, in a block 310, the server 135 retrieves a set of maintenance instructions and a schematic of the component 125. As described above, the server 135 can communicate with an external server 200 over the network 130 to retrieve a set of maintenance instructions to replace the component 125 and a three-dimensional schematic of the component 125. The maintenance instructions can include a list of tools required to replace the component 125. The three-dimensional schematic can be a CAD file that an additive printer 210 can use to manufacture a replacement component 125.

Next, in a block 315, the server 135 specifies a time and a location to replace the component 125. As described above, the server 135 can specify the time based on the predicted time to failure, i.e., the server 135 can specify the time as a time prior to the predicted time to failure. The server 135 can specify the location as a location capable of replacing the component 125. For example, the server 135 can specify the location as a repair location 205 that includes an additive printer 210 to manufacture a replacement component 125, a repair machine 215 to replace the component 125, and all tools in the list of tools provided by the maintenance instructions. The server 135 can specify the time based on an availability of the repair location 205.

Next, in a block 320, the server 135 instructs the additive printer 210 at the repair location 205 to manufacture a replacement component 125 according to the schematic. The server 135 can send the CAD file over the network 130 to the additive printer 210, and the additive printer 210 can deposit layers of material according to the CAD file to manufacture the replacement component 125.

Next, in a block 325, the server 135 instructs the computer 105 to move the vehicle 101 to the specified location at the specified time. The server 135 can instruct the computer 105 to actuate a steering, propulsion, and brake of the vehicle 101 to move the vehicle 101 to the specified location. That is, the server 135 can instruct the computer 105 to operate in an autonomous mode to move the vehicle 101 to the repair location 205. The computer 105 can determine the actuation of the steering, propulsion, and brake based on a conventional navigation algorithm to move from a current location of the vehicle 101 to the repair location 205.

Next, in a block 330, the server 135 instructs the repair machine 215 to replace the component 125 of the vehicle 101. As described above, the repair machine 215 can follow the maintenance instructions to replace the component 125 with the replacement component 125 manufactured by the additive printer 210. For example, the repair machine 215 can include an arm that removes the component 125 from the vehicle 101 and installs the replacement component 125 to the vehicle 101. The arm can include a tool that (e.g., a socket wrench, a screwdriver, etc.) that removes a fastener from the component 125 to allow removal of the component 125. The repair location 205 can include a plurality of repair machines 215 to apply the maintenance instructions to replace the component 125.

Next, in a block 335, the server 135 determines whether to continue the process 300. The server 135 can determine to continue the process 300 upon receiving additional data 115 from one or more vehicles 101. If the server 135 determines to continue, the process 300 returns to the block 305. Otherwise, the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 135, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
    predict a time to failure of a vehicle component according to a damage model generated from vehicle operating data;
    based on the predicted time to failure, retrieve a schematic of the vehicle component and input the schematic to an additive printer to manufacture a replacement vehicle component; and
    specify maintenance instructions that include a time and location to replace the vehicle component based at least in part on the predicted time to failure of the vehicle component, a delivery time of a second vehicle component to the specified location, and a time for the additive printer to manufacture the replacement vehicle component;
    wherein the vehicle component is replaced with the replacement vehicle component according to the maintenance instructions.

2. The system of claim 1, wherein the instructions further include instructions to actuate a repair machine at the specified location according to the maintenance instructions.

3. The system of claim 1, wherein the damage model includes at least one of a mass reduction rate, a temperature-based wear rate, or a mass flow rate.

4. The system of claim 1, wherein the instructions further include instructions to predict the time to failure based on at least one of a vibration or a sound from the vehicle component.

5. The system of claim 1, wherein the instructions further include instructions to predict the time to failure when output performance of the vehicle component falls below a threshold.

6. The system of claim 1, wherein the instructions further include instructions to actuate a propulsion to move a vehicle to which the vehicle component is installed to the specified location prior to the specified time.

7. The system of claim 1, wherein the instructions further include instructions to specify the time to replace the vehicle component based on a predicted amount of time required to complete the maintenance instructions.

8. The system of claim 1, wherein the instructions further include instructions to predict the time to failure based on a previous maintenance time of the vehicle component.

9. The system of claim 1, wherein the specified time is based on a predicted time that the additive printer will complete manufacturing of the replacement vehicle component.

10. The system of claim 1, wherein the maintenance instructions include a list of tools, and the instructions further include instructions to specify the location to replace the vehicle component as a location having all tools in the list of tools without requiring delivery or manufacture of the tools.

11. A method, comprising:
    predicting a time to failure of a vehicle component according to a damage model generated from vehicle operating data;
    based on the predicted time to failure, retrieving a schematic of the vehicle component and inputting the schematic to an additive printer to manufacture a replacement vehicle component; and
    specifying maintenance instructions that include a time and location to replace the vehicle component based at least in part on the predicted time to failure of the vehicle component, a delivery time of a second vehicle component to the specified location, and a time for the additive printer to manufacture the replacement vehicle component;
    replacing the vehicle component with the replacement vehicle component according to the maintenance instructions.

12. The method of claim 11, further comprising actuating a repair machine at the specified location according to the maintenance instructions.

13. The method of claim 11, further comprising predicting the time to failure based on at least one of a vibration or a sound from the vehicle component.

14. The method of claim 11, wherein the damage model includes at least one of a mass reduction rate, a temperature-based wear rate, or a mass flow rate.

15. The method of claim 11, further comprising predicting the time to failure when output performance of the vehicle component falls below a threshold.

16. The method of claim 11, further comprising actuating a propulsion to move a vehicle to which the vehicle component is installed to the specified location prior to the specified time.

17. The method of claim 11, further comprising specifying the time to replace the vehicle component based on a predicted amount of time required to complete the maintenance instructions.

18. The method of claim 11, further comprising predicting the time to failure based on a previous maintenance time of the vehicle component.

19. The method of claim 11, wherein the specified time is based on a predicted time that the additive printer will complete manufacturing of the replacement vehicle component.

20. The method of claim 11, wherein the maintenance instructions include a list of tools, and the method further comprises specifying the location to replace the vehicle component as a location having all tools in the list of tools without requiring delivery or manufacture of the tools.

* * * * *